US011434139B2

(12) United States Patent
Salamon (10) Patent No.: US 11,434,139 B2
(45) Date of Patent: Sep. 6, 2022

(54) PROCESS FOR PRODUCING FUMED SILICA (71) Applicant: WACKER CHEMIE AG, Munich (DE)

(72) Inventor: Marcel Salamon, Marktl (DE)

(73) Assignee: WACKER CHEMIE AG, Munich (DE)

(*) Notice: Subject to any disclaimer, the term of this patent is extended or adjusted under 35 U.S.C. 154(b) by 315 days.

(21) Appl. No.: 16/492,746

(22) PCT Filed: Feb. 22, 2018

(86) PCT No.: PCT/EP2018/054393
§ 371 (c)(1),
(2) Date: Sep. 10, 2019

(87) PCT Pub. No.: WO2018/162246
PCT Pub. Date: Sep. 13, 2018

(65) Prior Publication Data
US 2021/0155488 A1 May 27, 2021

(30) Foreign Application Priority Data
Mar. 10, 2017 (DE) .......................... 102017203998.1

(51) Int. Cl.
C01B 33/18 (2006.01)
(52) U.S. Cl.
CPC .................. C01B 33/183 (2013.01)
(58) Field of Classification Search
CPC ......... C01B 33/183; B01J 6/008; B01J 6/005; B01J 12/005; B01J 19/0013; B01J 2208/00557; B01J 2208/00637; B01J 2208/00646; B01J 2219/00166; C08K 3/36
See application file for complete search history.

(56) References Cited

U.S. PATENT DOCUMENTS

| 3,663,283 | A | 5/1972 | Hebert et al. |
| 4,292,290 | A | 9/1981 | Tunison, III |
| 6,852,301 | B2* | 2/2005 | Block ................... C01B 33/043 423/347 |
| 2007/0253884 | A1* | 11/2007 | Liu ....................... C01B 33/183 423/337 |

(Continued)

FOREIGN PATENT DOCUMENTS

| DE | 974793 C | 4/1961 |
| DE | 2048220 A1 | 4/1971 |

(Continued)

OTHER PUBLICATIONS

Manfred Pahl et al., "Einsatz und Auslegung Statischer Mischer", Chem.-Ing-Tech 51, (1979) Nr 5, S. 347-364 (English Abstract).

Primary Examiner — Anthony J Zimmer
Assistant Examiner — Logan Edward Laclair
(74) Attorney, Agent, or Firm — Brooks Kushman P.C.

(57) ABSTRACT

Instabilities in the pyrogenic production of fumed silica caused by use of silanes having low ignition temperatures are caused by mixing the silanes, at a temperature above their dew point(s) with fuel gas in the absence of the use of a dynamic or static mixer, and then combining the resultant mixed stream with an oxygen containing gas and igniting. Self-ignition of the silanes and also the deposition of flammable or pyrophoric substances are avoided.

20 Claims, 5 Drawing Sheets (56) References Cited

U.S. PATENT DOCUMENTS

| | | | |
|---|---|---|---|
| 2011/0204283 A1* | 8/2011 | Davis | C09C 1/30 |
| | | | 252/79.1 |
| 2016/0107895 A1 | 4/2016 | Schulze Isfort et al. | |
| 2016/0115042 A1 | 4/2016 | Schulze Isfort et al. | |

FOREIGN PATENT DOCUMENTS

| | | |
|---|---|---|
| EP | 2433905 B1 | 3/2012 |
| WO | 2015003873 A1 | 1/2015 |

\* cited by examiner

PROCESS FOR PRODUCING FUMED SILICA

CROSS REFERENCE TO RELATED APPLICATIONS

This application is the U.S. National Phase of PCT Appln. No. PCT/EP2018/054393 filed Feb. 22, 2018, which claims priority to German Application No. 10 2017 203 998.1 filed Mar. 10, 2017, the disclosures of which are incorporated in their entirety by reference herein.

BACKGROUND OF THE INVENTION

1. Field of the Invention

The invention pertains to the production of fumed silica by pyrolysis of one or more silanes in a flame in a reactor.

2. Description of the Related Art

Fumed silicas are obtained from gaseous oxidizable and/or hydrolyzable silicon compounds, generally from silanes or silane mixtures, which are evaporated and, before entering a burner nozzle, are typically mixed with an oxygen source and a fuel gas. In the course of this mixing, however, the temperature of the silicon compounds must not fall below their dew point, since there is otherwise the formation of droplets or mist as a result of the condensation of the silicon compounds. This droplet formation leads to flame instability up to and including cessation of combustion. If production of fumed silicas is even possible, there are considerable losses of quality. For this reason, all reactants including the oxygen source must be preheated to such an extent that the temperature of the gas mixture comprising the silicon compounds is constantly above the dew point temperature, so that no condensation of the silicon compounds is possible.

If, however, the ignition temperature of the silicon compounds on encountering an oxygen source is below the temperature of the oxygen source and/or the temperature of the silicon compound, the mixture will ignite prior to entry into the reaction chamber. Processing of silicon compounds such as silanes or silane mixtures having very low ignition temperatures has therefore not been possible to date. In the context of this invention, ignition temperatures are very low when the ignition temperature of the silicon compound is in the immediate region of the dew point temperature of the silicon compound (i.e. up to 5 kelvin above the dew point) or below the dew point temperature of the silicon compound.

Very low ignition temperatures also occur during startup operations (for example on reactor startup) as a result of the fractionation of the gas phase in the evaporator for the silicon compounds or in the feed of the silicon compounds to the burner when a feed mixture with appropriate proportions of silicon compounds having very low ignition temperatures, for example dichlorosilane ($H_2SiCl_2$), is introduced.

Modes of operation with oxygen contents higher than in air or with water vapor feeds have an additional destabilizing effect when ignition temperatures are already low. Stable silica production is not possible under these conditions.

EP 2 433 905 describes, for example, a process for producing fumed silicon dioxide powder, in which a silicon compound is evaporated and supplied to a mixing chamber. Preheated fuel gas and preheated primary air are supplied separately to the mixing chamber. The mixture is then ignited in a burner.

It is a prerequisite of this process that the temperature in the mixing chamber into which the silicon compound, the oxygen source and the fuel gas are introduced, is below the ignition temperature of the silicon compound since there would otherwise be self-ignition of the silicon compound in the mixing chamber. It is not possible to use silicon compounds or mixtures of silicon compounds having very low ignition temperatures since the formation of droplets or mist that has already been described occurs in the mixing chamber at the temperatures below the ignition temperature that are the maximum possible in this case.

Both WO 2015/003871 and WO 2015/003873 describe a process for producing silica, in which a stream of matter I comprising a silicon compound is mixed with a stream of matter II comprising oxygen with the aid of at least one mixing element. After supplying the fuel gas-containing stream of matter, the mixture is introduced into a reaction chamber in each case, where it is ignited and converted.

It is a prerequisite of this process too that the temperature in the mixing of the silicon compound with the oxygen source is below the ignition temperature of the silicon compound since there would otherwise be self-ignition of the silicon compound on contact with the oxygen source.

Silicon compounds with very low ignition temperatures again cannot be used, since the formation of droplets or mist that has already been described occurs in the mixing chamber at the temperatures that are the maximum possible in this case. In possible embodiments of the process, WO 2015/003871 (FIGS. 2A and 2B) shows that hydrogen and $SiCl_4$ are premixed in a static mixer and then contacted with air in a further static mixer.

This described configuration has crucial drawbacks. Firstly, the multistage mixer configuration leads to formation of deposits in the form of extremely flammable or pyrophoric solids, since static mixing elements form a high surface area which, as well as regions with laminar or turbulent flow, also includes dead spaces caused by inflow or outflow surfaces with higher levels of product deposits. Secondly, these deposits are more easily detached from the wall and entrained by the vortexing in the mixing element, and cause unwanted ignition prior to entry into the reaction chamber. There is no description of measures for reduction or control of these deposits.

The problem addressed was therefore that of overcoming the disadvantages of the prior art and of developing an economically viable process for producing fumed silicas in which silicon compounds having low ignition temperatures can be used as starting materials without occurrence of ignition in the mixing chamber of the burner prior to entry into the burner nozzle. Moreover, the described problems with the extremely flammable or pyrophoric deposits that form were to be minimized.

These problems are solved by the invention, which provides a process in which the silicon compounds are first combined with fuel gas before they are introduced into an oxygen source, dispensing with any static or dynamic mixing element in this step.

SUMMARY OF THE INVENTION

Fumed silica is produced by a process, in which a stream of matter (a), comprising at least one fuel gas, is combined with a stream of matter (b), comprising at least one silane selected from the group consisting of dichlorosilane ($H_2SiCl_2$), monochlorosilane ($H_3SiCl$) or monosilane ($SiH_4$) or mixtures thereof, to give a stream of matter (c), without using a static or dynamic mixing element, and in which stream of matter (c) is supplied to a stream of matter (d), comprising at least one oxygen source, streams of matter (c) and (d) are mixed with a mixing element to give a stream of matter (e), stream of matter (e) is introduced into a reaction chamber, where it is ignited and converted, and the resultant solids are removed. The invention further provides an apparatus for executing the process.

DETAILED DESCRIPTION OF THE PREFERRED EMBODIMENTS

The invention thus provides a process for producing fumed silica, in which a stream of matter (a), comprising at least one fuel gas, is combined with a stream of matter (b), comprising at least one silane selected from the group consisting of dichlorosilane ($H_2SiCl_2$), monochlorosilane ($H_3SiCl$) or monosilane ($SiH_4$) or mixtures thereof, to give a stream of matter (c), without using a static or dynamic mixing element, and in which stream of matter (c) is supplied to a stream of matter (d), comprising at least one oxygen source, streams of matter (c) and (d) are mixed with a mixing element to give a stream of matter (e), stream of matter (e) is introduced into a reaction chamber, where it is ignited and converted, and the resultant solids are removed.

Fumed silica in the context of the invention means silicon dioxide, i.e. oxygen acids of silicon, and is a colloidal material which is synthetically produced in a flame process and has defined properties and particle size. It consists entirely of amorphous silicon dioxide particles ($SiO_2$) that aggregate and agglomerate to form larger units.

Stream of matter (a) comprises at least one fuel gas. Fuel gases used are preferably hydrogen, natural gas, methane, ethane, propane or mixtures thereof. The fuel gas is preferably natural gas, hydrogen or a mixture of natural gas and hydrogen; the fuel gas is more preferably hydrogen. Natural gas is a gas mixture of natural origin that consists mainly of methane.

Stream of matter (b) comprises at least one silane selected from the group consisting of dichlorosilane ($H_2SiCl_2$), monochlorosilane ($H_3SiCl$) or monosilane ($SiH_4$) or mixtures thereof. In addition to at least one of the silanes mentioned, stream of matter (b) preferably comprises a further silicon compound selected from the group consisting of tetrachlorosilane ($SiCl_4$), trichlorosilane ($HSiCl_3$), trichloromethylsilane ($CH_3SiCl_3$) or dichloromethylsilane ($CH_4Cl_2Si$) or mixtures thereof.

Silicon compounds used are preferably chloride, nitrate, sulfate, carbonate, carboxylate, carbonyl, acetylacetonate, alcoholic compounds or mixtures thereof; particular preference is given to using chlorosilanes.

The term "silane" represents a group of chemical compounds that consist of a silicon base skeleton and hydrogen. The silane may include small amounts of further constituents, for example other silicon compounds or hydrocarbons or other substances that arise in the preparation of silanes or are present as a result of the preparation, or trace elements.

While dichlorosilane ($H_2SiCl_2$), monochlorosilane ($H_3SiCl$) or monosilane ($SiH_4$) or mixtures thereof are notable for low ignition temperatures, silicon tetrachloride ($SiCl_4$) is an example of a noncombustible silane. Relatively high ignition temperatures in the gas phase are possessed by silanes such as methyltrichlorosilane ($CH_3SiCl_3$) and trichlorosilane ($HSiCl_3$), for example.

According to the invention, stream of matter (a) and stream of matter (b) are combined to give a stream of matter (c) without using a static or dynamic mixing element. Streams of matter (a) and (b) are preferably combined in a tube. It is particularly preferable that the length of this tube is not more than 0.5 m, more preferably not more than 0.3 m, and opens into a filter, such that streams of matter (a) and (b) are combined immediately upstream of a filter.

It is unimportant here whether stream of matter (b) is combined with stream of matter (a) or vice versa.

Prior to the combination, stream of matter (a) has to be brought to a controlled temperature above the dew point temperature of stream of matter (b) in order to prevent droplet formation as a result of the condensation of the silane out of stream of matter (b) (for details and problems see below). In this step, however, there is no need to take account of the ignition temperature since there is no oxygen source for self-ignition.

It has been found that, surprisingly, the ignition temperature of stream of matter (c) is elevated compared to the ignition temperature of stream of matter (b). According to the invention, the ignition temperature of stream of matter (c) is preferably at least 5 degrees kelvin, more preferably at least 10 degrees kelvin, above the dew point temperature of stream of matter (b).

This increase in the ignition temperature has the major advantage that both stream of matter (c) and stream of matter (d) can reliably be brought to a controlled temperature above the dew point temperature of stream of matter (b) without occurrence of ignition on subsequent contact with stream of matter (d). Therefore, stable production startup and stable production of fumed silica is possible. Thus, it is a great advantage of the process of the invention that it is possible to use dichlorosilane, monochlorosilane, monosilane or mixtures thereof in stream of matter (b).

The ignition temperature (also ignition point, self-ignition temperature, igniting temperature or igniting point) is that temperature to which a substance or a contact surface has to be heated in order that a combustible substance (solid, liquid, vapors thereof or gas) self-ignites in the presence of an oxygen source (such as air) on account of its temperature alone—i.e. without an ignition source such as an ignition spark. In the context of this invention, the ignition temperature always means the ignition temperature of the gaseous substance.

DE 2048 220 discloses that both fuel gas-containing streams of matter and silicon compound—containing streams of matter with an oxygen source form troublesome but only slightly reactive deposits, meaning that the deposits are not pyrophoric or extremely flammable; a production process is still viable. It is likewise known that pure silanes/silane mixtures also form such deposits.

It has now been found that, surprisingly, in the case of use of the inventive stream of matter (b) and the requisite mixing of the inventive stream of matter (a) therewith, in the absence of an oxygen source, there is formation of pyrophoric or extremely flammable solids. The deposition of these solids as deposits increases, for example, with the surface area and/or when there are regions with a relatively low flow rate, as is the case in the mixing elements customarily utilized for mixing of gas streams. The deposits are also referred to as solid deposits of reactive compounds. The basis of the term "reactive" is that the solid deposits are pyrophoric or extremely flammable.

The extremely flammable or pyrophoric solids can already be formed, inter alia, as a result of the most minor production-related impurities in the silane feed (for example with boron chloride). Contaminated hydrogen may likewise contain reactive substances that promote the formation of such deposits. The reactive compounds or reactive solids that form these deposits therefore especially include compounds of the elements boron or silicon with hydrogen or boron and silicon with hydrogen. It is suspected that these are borates or boranes.

A feed refers to the starting materials used. For instance, the silane feed refers to the silane starting substance supplied.

Extremely flammable solids in the context of this invention are those which have been contacted with an oxygen source and which can ignite even under minor mechanical stresses as arise, for example, through mere deflection in mixing elements, or which can ignite even at temperatures below 100° C.

Pyrophoric chemical substances refer to those that react vigorously with oxygen even at low temperature, for example room temperature, and under air. The energy released in this oxidation is sufficiently high that the substances glow or even go up in flames.

The extremely flammable or pyrophoric solids are ignited on contact with an oxygen source. For example, even the introduction of very small amounts of the deposits formed into the mixing chamber is sufficient and can lead to abrupt ignition in the mixing chamber during operation, and very small ignition energies are sufficient for the ignition of the entire mixture. The solids that originate from the deposits, even in very small amounts, provide ignition energy sufficient for ignition.

The presence of a static or dynamic mixing element promotes both the formation of extremely flammable or pyrophoric deposits and the entrainment thereof to the oxygen stream and hence uncontrolled ignition upstream of or within the mixing chamber and/or the mixing element. The mixing chamber contains a mixer configuration with at least one static or dynamic mixing element, with combination of stream of matter (c) and stream of matter (d) in the chamber upstream of the mixing element. The mixing chamber then opens directly into the reaction chamber containing the burner. The term "reaction chamber" can be equated with "reactor" or "reactor chamber." Therefore, uncontrolled ignition upstream of or within the mixing chamber simultaneously means uncontrolled ignition before entry into the reactor.

The mixture of (c) and (d) is intentionally ignited by triggering the ignition, for example by an ignition spark, in the reactor burner.

As described in detail in the article by Pahl and Muschelknautz (1979), the term "static mixing element" refers to apparatuses with fixed internals having the feature that flow-affecting elements in a tube alternately divide and combine the stream of matter and hence bring about mixing. These are used, for example, for mixing gaseous streams of matter.

The mixing elements include, as well as static mixing elements, also dynamic mixing elements that feature mobile (e.g. rotating) internals.

Because there is no static or dynamic mixing element for mixing of streams of matter (a) and (b), the process of the invention has the advantage that, even when silicon compounds such as silanes or silane mixtures with very low ignition temperatures are used, stable reactor startup and a stable reaction profile is possible.

In addition, the lack of a static or dynamic mixing element has economic advantages since it is possible to dispense with one plant element and there is no need for maintenance thereof, for example cleaning, or replacement thereof as a disposable product after a certain service life in order, inter alia, to limit formation and entrainment of solids.

It has also been found that, surprisingly, it is possible to avoid spontaneous ignition, for example as a result of oxygen diffusing to the contact site of streams of matter (a) and (b) or growth of the pyrophoric or extremely flammable solids formed as far as the oxygen stream when a sufficient minimum distance of the contact site of streams of matter (a) and (b) from the oxygen stream (d) is observed.

Therefore, in a preferred embodiment, the distance from the contact site of streams of matter (a) and (b) to the oxygen stream (d) is at least 0.5 m, more preferably at least 1.5 m.

In the event of a plant shutdown, the connection of the oxygen source to the contact site of (a) and (b) is preferably interrupted. In this case, the supply of stream of matter (c) is interrupted. It is especially preferable that the supply of stream of matter (c) is interrupted mechanically by the installation of a fitting, most preferably a nonreturn fitting. In this case, stream of matter (d) does not come into contact either with streams of matter (a), (b) or (c) or with the extremely flammable or pyrophoric deposits formed. Likewise preferably, an inert gas, for example nitrogen, is supplied during the plant shutdown in place of stream of matter (c), in which case the inert gas prevents diffusion of stream of matter (d) to the contact site of stream of matter (a) and stream of matter (b) and hence potential ignition.

In a particularly preferred embodiment of the invention, it is a feature of the process that the connection of stream of matter (d) to the contact site of (a) and (b) is mechanically interrupted by a nonreturn fitting in the pipeline in which stream of matter (c) is supplied and inert gas is supplied. This fitting is labeled AI in the figures.

A fitting refers to a component that serves to alter or block streams of matter. The fittings include shut-off flaps, valves, slide valves or stopcocks, nonreturn flaps or nonreturn valves.

Furthermore, it is preferable that the supply of stream of matter (b) into stream of matter (a) can also be regulated by a fitting (labeled AII).

It is likewise preferable that the supply of stream of matter (b) into stream of matter (d) can be regulated by a fitting (labeled AIII).

The processes described in the prior art cannot work over prolonged periods with silicon compounds having a dew point temperature below the ignition temperature. Nor can they work with silicon compounds having an ignition temperature below the temperature of the oxygen source. In both cases, the mixture would ignite on contact with the oxygen source in the mixing chamber described in the closest prior art and before the reaction chamber. Production startup and hence production of fumed silica would not be possible.

Figure 2:
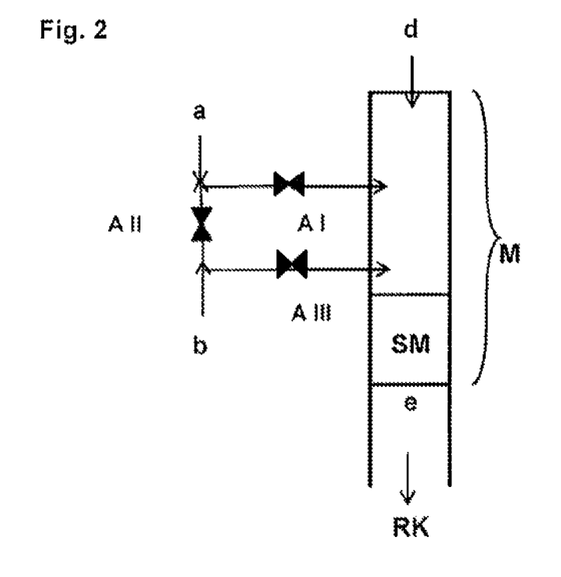
Figure 2A:
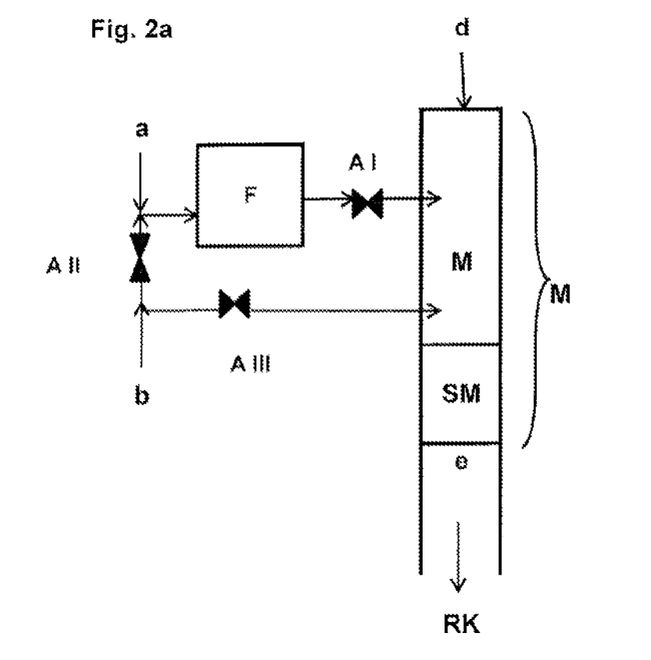
Figure 2B:
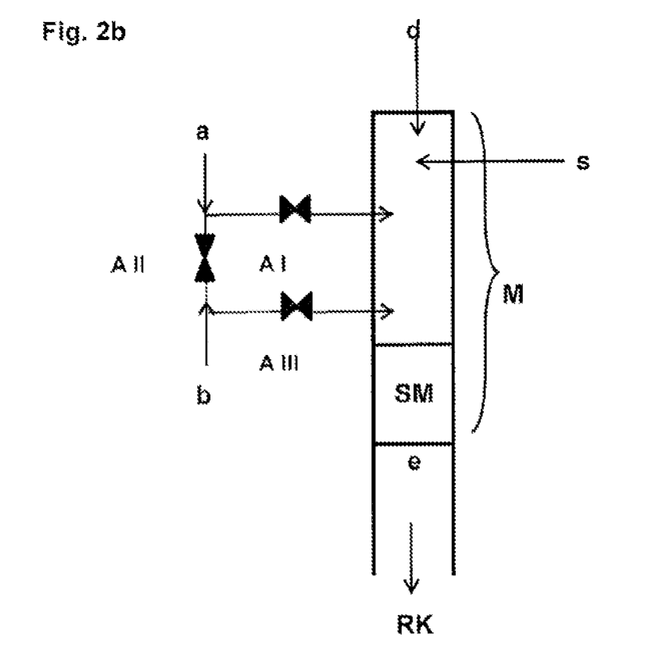
Figure 2C:
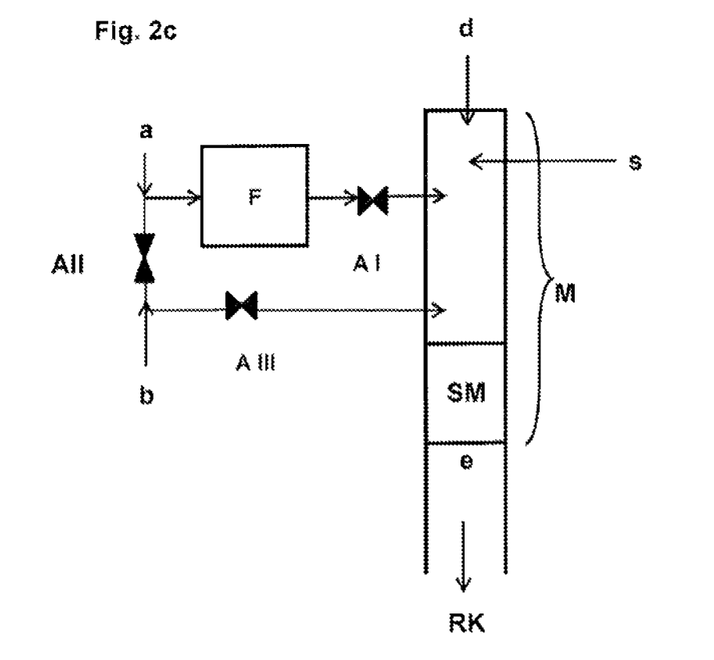

Even if, as shown in FIG. 2A of WO 2015/003871, the fuel gas-containing stream of matter is premixed with the silicon compound-containing stream of matter, stable production of silica is not possible over a prolonged period owing to the formation of extremely flammable deposits in the mixing element described.

Subsequently, stream of matter (c) is supplied to stream of matter (d), where stream of matter (d) comprises at least one oxygen source. The resulting stream of matter is referred to as "(e)." The oxygen source used may, for example, be air, oxygen or oxygen-enriched air; more preferably, stream of matter "d" is air. Preferably, stream of matter "c" is introduced into an air stream.

In the context of this invention, the mixing chamber M refers to that space in which streams of matter (a), (b) and/or (c) are combined with stream of matter (d). The mixing chamber is preferably also a tube. Preferably, stream of matter (c) is introduced into stream of matter (d).

The mixing chamber preferably contains at least one mixing element. It is possible here to use any desired, preferably static, mixing element (SM) (the above statements are applicable for description of the terms and examples); it is also possible to use multiple mixing elements. More preferably, this mixing element or arrangement of multiple mixing elements is chosen such that it is possible to obtain a silica with defined quality parameters, for example a defined surface area and thickening effect.

For example, it is important that the chosen mixing element(s) achieve(s) a particular degree of mixing, i.e. sufficient mixing quality. Mixing quality is known to the person skilled in the art as a dimensionless coefficient of variation of the concentration distribution. Thus, it is possible to adjust the properties of the silica produced independently of the mixing element type chosen or the mixer configuration chosen, for example a combination of multiple mixers. All that matters is the mixing quality achieved.

As soon as fuel gas and silicon compound come into contact with the oxygen source, there is the risk of self-ignition, i.e. ignition exclusively owing to the temperature without the presence of an ignition source such as an ignition spark. However, ignition prior to entry into the reactor chamber is a barrier to stable silica production. In order to prevent such ignition, the temperature of stream of matter (d) is preferably at least 5 degrees kelvin, more preferably at least 10 degrees kelvin, below the ignition temperature of stream of matter (c).

Moreover, there is the risk of formation of droplets or mist as a result of the condensation of the silicon compound. Such droplet formation can lead to flame instability combined with considerable losses of quality of the silica produced, up to and including cessation of the combustion reaction. It is therefore preferable that the temperature of stream of matter (d) is at least 5 degrees kelvin, more preferably at least 10 degrees kelvin, above the dew point of stream of matter (c).

The combination of streams of matter (a) and (b) combined with a distinct increase in the ignition temperature makes it much simpler, and frequently makes it actually possible at all, to control the temperature of stream of matter (d) such that its temperature is below the ignition temperature but above the dew point temperature of stream of matter (c).

Moreover, it is possible to separately supply further reactants in stream of matter (d), for example further silicon compounds (for example further silanes such as trichloromethylsilane, methyldichlorosilane) or further combustion gases having comparatively high ignition temperatures (identified as stream of matter (s) in FIGS. 1$b$, 1$c$, 2$b$ and 2$c$).

The dew point, also called the dew point temperature, is that temperature below which the temperature must reach at constant pressure for vapor to be deposited as a liquid or as a mist out of a gas mixture comprising condensable constituents.

According to the invention, streams of matter (c) and (d) are mixed with a mixing element to give a stream of matter (e).

According to the invention, stream of matter (e) is then introduced into a reaction chamber with a burner, where it is ignited and converted.

In the next step, the solids formed are removed.

Particular preference is given to the execution of the process of the invention for use of silanes or silane components in the mixture with very low ignition temperatures in the gaseous state for production of fumed silica. These silanes include, for example, dichloro- and monochlorosilane.

WO 2015/003873 describes a stream of matter (page 8 lines 20 ff.) comprising, as main constituents, 60-99% % by weight of $SiCl_4$ and 0.5-40% $HSiCl_3$ and, as secondary constituents with a proportion of less than 5% by weight, $H_2SiCl_2$, $SiH_4$ and $H_3SiCl$ and HCl, based in each case on the by-product. The limitation to these values results from the fact that the ignition temperature of the mixture in the case of the composition described still has a sufficient margin from the dew point temperature. The present invention therefore has the great advantage over the prior art cited that it is also possible to use higher proportions of extremely ignitable silanes such as dichloro- and monochlorosilane.

In a preferred embodiment, the following is applicable to the process of the invention: stream of matter (a) consists of hydrogen and natural gas; stream of matter (b) consists of a silane or a silane mixture; and air is used as stream of matter (d).

Preferably, the proportion of the fuel gas is at least 1 percent by weight, more preferably at least 1.8 to 30 percent by weight, and most preferably at least 1.9 to 6.5 percent by weight, based on the total mass of the stream of matter (c) consisting of fuel gas and silicon compound. The proportion of the fuel gas in percent by weight is based on its mass.

It has been found that, surprisingly, the entrainment of the ignitable solids can be almost completely reduced when streams of matter (a) and (b) are combined directly upstream of a filter or within a filter. In this case, the solids formed are retained in the filter and do not reach the oxygen source.

Preferably, therefore, stream of matter (c) is filtered. The use of a filter has the advantage that solids formed or already present are removed. In this way, a significantly smaller amount of extremely flammable or pyrophoric solids, if any, is entrained into the oxygen source. For example, the solids formed in the constant mixing of possibly contaminated silicon compounds, for example silane mixtures with pure or contaminated hydrogen-containing fuel gases, are kept away from the mixing chamber. The solids formed or present are removed in the filter and thus cannot lead to ignition on contact with oxygen and entrainment into the mixing chamber, or to adverse effects on quality as a result of introduction of solids.

It is particularly preferable that streams of matter (a) and (b) are contacted immediately upstream of a filter (see above). In a preferred embodiment of the process, streams of matter a and b are contacted in a filter. The expression "in a filter" means that the filter is equipped with two separate inlets for streams of matter a and b.

The filter used is preferably a screen basket filter having a mesh size of <100 μm, more preferably <80 μm.

When the inventive mixing of stream of matter (a) and (b) to give stream of matter (c) proceeds merely on account of the fractionation in the silane evaporator on reaction startup, the premixing of streams of matter (a) and (b) is necessary only on startup of the burner and in the running-in phase thereof. As soon as the silane is being evaporated in such a way that the fractionation does not give rise to a gas mixture of silicon compounds with low ignition temperatures, there is no need for the premixing. It is therefore preferable that the process of the invention is conducted for not more than one hour, more preferably not more than 15 min and especially not more than 5 min, and streams of matter (a) and (b) are then separated and contacted with stream of matter (d) upstream of a mixing element (SM) in any sequence.

This particular configuration of the invention is shown by way of example in FIG. 2a. During startup operation, fitting II is open and fitting III is closed. During sustained operation, fitting II is open and fitting III is closed. Fitting I is closed only at plant shutdown.

This configuration of the invention has the advantage that the possibility of growth of extremely flammable or pyrophoric deposits is reduced to a minimum by the minimization of the contact time between hydrogen and the silicon compound comprising the production-related impurities, and hence the stability of the reaction is prolonged to a maximum.

The invention further provides an apparatus for executing the above-described process of the invention, characterized in that a pipeline RI comprising stream of matter (a), which comprises at least one fuel gas, and a pipeline RII comprising stream of matter (b), which comprises at least one silane selected from the group consisting of dichlorosilane ($H_2SiCl_2$), monochlorosilane ($H_3SiCl$) or monosilane ($SiH_4$) or mixtures thereof, are introduced into a pipeline RIII, where RIII contains a fitting AI and no static mixing element, the pipeline RIII is introduced into a mixing chamber, comprising stream of matter (d), which comprises at least one oxygen source, where the mixing chamber is constructed from a pipeline that opens into at least one static mixing element, the mixture from the mixing chamber is guided into the reaction chamber, where it is ignited and converted, and the resultant solids are removed.

The abovementioned definitions and examples are applicable to the streams of matter, fittings and filters.

It is a feature of the fitting AI that, in the open state, it introduces streams of matter (a), (b) and/or (c) into the mixing chamber. If fitting AI is closed, the connection to the contact site of streams of matter (a) and (b) is interrupted and hence pipeline RIII is closed.

It is preferable that AI is executed as a nonreturn flap.

It is preferable that pipeline RIII comprises a filter.

It is further preferable that RI and RII can be separated by a fitting AII. It is a feature of AII that, in the open state, it introduces stream of matter (b) into RIII, into which RI is also being introduced, and hence brings about the formation of stream of matter (c). If AII is closed, there is no supply of RII that guides stream of matter b into RI that guides stream of matter (a).

It is also preferable that RII contains a fitting AIII. If AII is closed and AI and AIII are open, streams of matter a and b flow separately into the mixing chamber M.

In addition, it is preferable that pipeline RIV, comprising a stream of matter (s), comprising a silane or silane mixtures having a high ignition temperature or $SiCl_4$, is introduced into the mixing chamber.

M denotes the mixing chamber

SM denotes at least one static mixing element.

a denotes the stream of matter (a) containing the fuel gas.

b denotes the stream of matter (b) containing at least one silane, selected from the group consisting of dichlorosilane ($H_2SiCl_2$), monochlorosilane ($H_3SiCl$) or monosilane ($SiH_4$) or mixtures thereof.

R denotes a pipeline.

RI denotes the pipeline in which stream of matter (a) is guided.

RII denotes the pipeline in which stream of matter (b) is guided.

RIII denotes the pipeline into which streams of matter (a) and (b) are introduced and in which stream of matter (c) is guided.

RIV denotes the pipeline in which stream of matter (s) is guided.

AI, AII and AIII denote fittings.

F denotes a filter.

RK denotes the reaction chamber.

The invention is described in detail hereinafter with reference to working examples without being restricted thereby.

EXAMPLES

Example 1: Comparative Example (Noninventive)

Stream of matter (b) is a silane mixture coming from industrial scale production, having a composition composed of 63.7% by volume of silicon tetrachloride, 8.0% by volume of trichlorosilane, 28.1% by volume of dichlorosilane and 0.2% by volume of monochlorosilane.

As a result of the preparation, the silane mixture may contain small amounts of impurities (e.g. boron chloride, aluminum chloride, or hydrocarbons, or further silanes (up to 0.1% by volume)).

Figure 3:
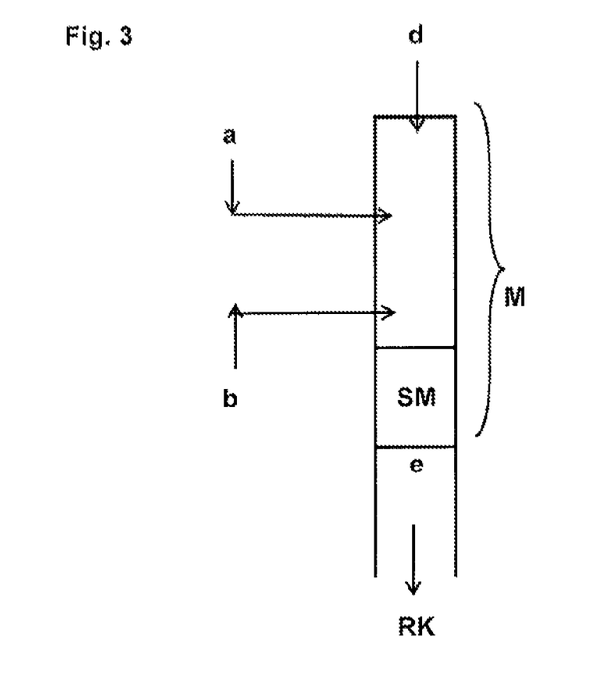
FIG. 3 shows a noninventive comparative example.

The silane mixture is converted to a gaseous state in the silane evaporator and introduced at a temperature of 105° C. via a pipe connection as shown in FIG. 3, but without premixing with a stream of matter (a), into an air stream (stream of matter (d)) having a temperature of 105° C. in a mixing chamber. A stream of matter (a), consisting of natural gas and hydrogen, is introduced separately into the mixing chamber M via a further pipe connection at a temperature of 105° C. The silane mixture already ignites in the mixing chamber M, as a result of which the safety devices stop the supply of the feedstocks. The production of fumed silica is not possible.

The mixing chamber used is a straight pipe. The static mixing element used is a commercial static mixer M of the Compax™ type from Sulzer.

Based on the total mass of fuel gas and silane, the proportion of silane is 93.2% and that of fuel gas 6.8%.

The ratio of hydrogen to natural gas is 1:1 based on the mass thereof. The volume flow rate of stream of matter (d) (air) chosen is at least stoichiometric in relation to oxygen. The total volume flow rate (stream of matter (e)) and the exit zone from the mixer are chosen such that both are within the optimal range of operation of the static mixer recommended by the manufacturer of the mixer.

Example 2

Stream of matter (b) is a silane mixture coming from industrial scale production, having a composition composed of 63.7% by volume of silicon tetrachloride, 8.0% by volume of trichlorosilane, 28.1% by volume of dichlorosilane and 0.2% by volume of monochlorosilane.

As a result of the preparation, the silane mixture may contain small amounts of impurities (e.g. boron chloride, aluminum chloride, or hydrocarbons, or further silanes (up to 0.1% by volume)).

Figure 1:
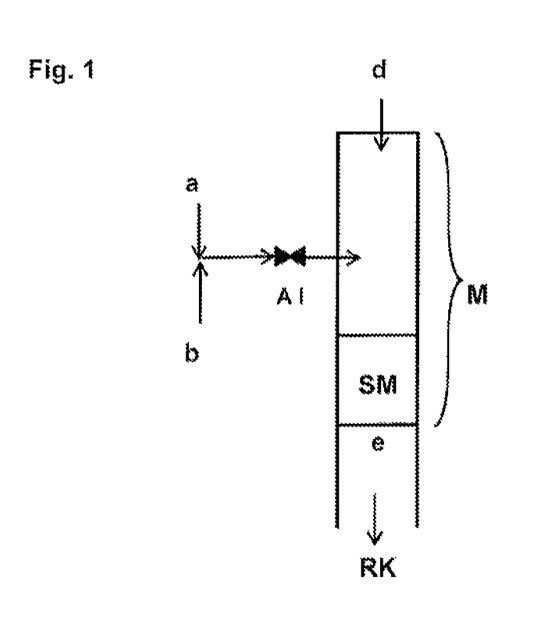
FIGS. 1, 1a, 1b, 1c, 2, 2a, 2b and 2c show possible embodiments of the invention.
Figure 1A:
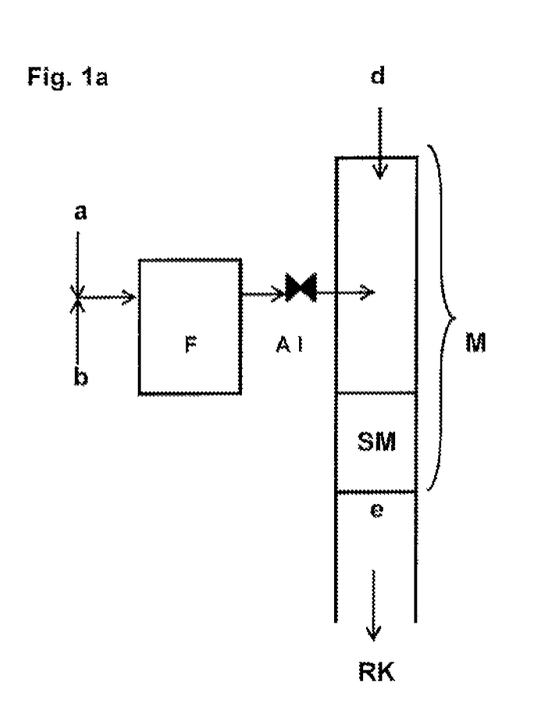
Figure 1B:
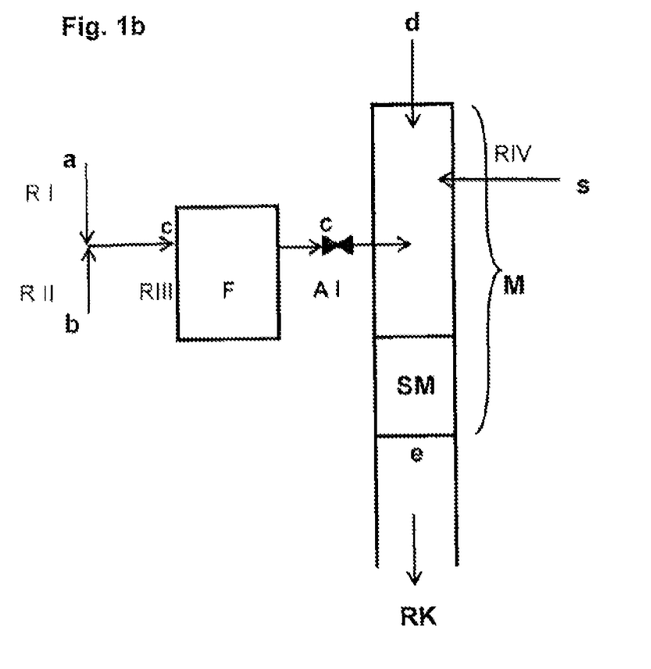
Figure 1C:
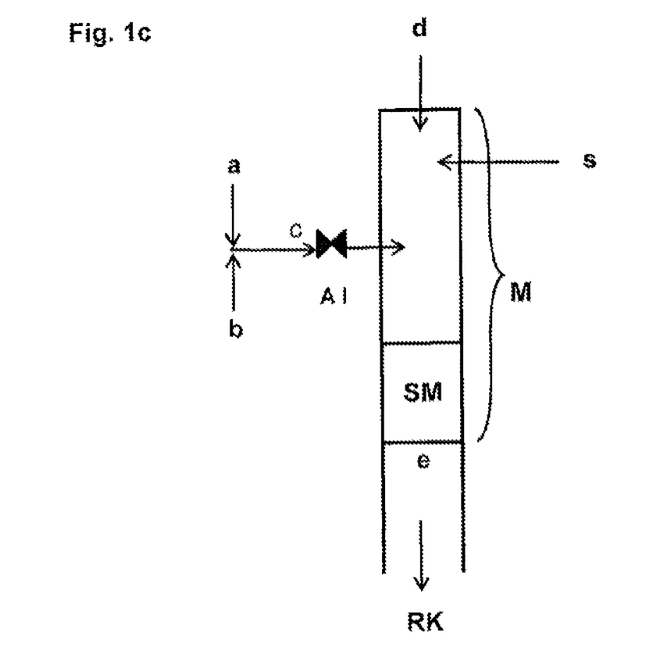

The silane mixture is converted to a gaseous state in the silane evaporator and contacted at a temperature of 105° C.

via a pipe connection as shown in FIG. 1 with a stream of matter (a) that has been heated up to 105° C., consisting of natural gas and hydrogen, upstream of a screen basket filter so as to attain 93.2 parts by weight of silane and 6.8 parts by weight of fuel gas (stream of matter (c)). The ratio of hydrogen to natural gas is 1:1 based on the mass thereof. The mixture from the screen basket filter is introduced at a temperature of 105° C. into a mixing chamber comprising an air stream (stream of matter (d)) at 105° C. and mixed therein with a static mixing element SM to give stream of matter (e). The fuel gas/silane mixture does not ignite on contact with the oxygen source composed of stream of matter (c) while still in the mixing chamber M, but does so as intended in the reaction chamber. The production of fumed silica is possible.

The mixing chamber used is a straight pipe.

The static mixing element M used is a commercial static mixer of the Compax™ type from Sulzer.

The distance between the contact site executed as a T-piece according to DIN 10253-4 FIG. 4 and the round gas inlet of the screen basket filter with the same nominal diameter is 2.5 times the nominal diameter of the T-piece. The diameter of the T-piece is chosen so as to result in a gas velocity of 12 m/s.

The volume flow rate of stream of matter (d) (air) chosen is at least stoichiometric in relation to oxygen. The total volume flow rate (stream of matter (e)) and the exit zone from the mixer are chosen such that both are within the optimal range of operation of the static mixer recommended by the manufacturer of the mixer.

Example 3 (Inventive)

Stream of matter (b) is a silane mixture coming from industrial scale production, having a composition composed of
63.7% by volume of silicon tetrachloride,
8.0% by volume of trichlorosilane,
28.1% by volume of dichlorosilane and
0.2% by volume of monochlorosilane.

As a result of the preparation, the silane mixture may contain small amounts of impurities (e.g. boron chloride, aluminum chloride, or hydrocarbons, or further silanes (up to 0.1% by volume)).

The silane mixture is converted to a gaseous state in the silane evaporator and contacted at a temperature of 105° C. via a pipe connection as shown in FIG. 1 with a stream of matter (a) that has been heated up to 105° C., consisting of natural gas and hydrogen, in a screen basket filter so as to attain 93.2 parts by weight of silane and 6.8 parts by weight of fuel gas (stream of matter (c)). The ratio of hydrogen to natural gas is 1:1 based on the mass thereof. The screen basket filter has been equipped with 2 separate inlets for stream of matter (a) and stream of matter (b). Mixture (c) from the screen basket filter is introduced at a temperature of 105° C. into a mixing chamber comprising an air stream (stream of matter (d)) at 105° C. and then mixed in a static mixer to give stream of matter (e). The fuel gas/silane mixture does not ignite on contact with the oxygen source composed of stream of matter (c) in the mixing chamber, but does so as intended in the reaction chamber. The production of fumed silica is possible.

The mixing chamber used is a straight pipe.

The static mixing element M used is a commercial static mixer of the Compax™ type from Sulzer.

The volume flow rate of stream of matter (d) (air) chosen is at least stoichiometric in relation to oxygen. The total volume flow rate (stream of matter (e)) and the exit zone from the mixer are chosen such that both are within the optimal range of operation of the static mixer recommended by the manufacturer of the mixer.

The invention claimed is:

1. A process for producing fumed silica in a reactor, comprising:
   i) combining a stream (a) which comprises at least one fuel gas, with a stream (b), which comprises at least one of silicon compound(s) dichlorosilane ($H_2SiCl_2$), monochlorosilane ($H_3SiCl$), and monosilane ($SiH_4$) without using a static or dynamic mixing element, to give a stream (c),
   ii) supplying the stream (c) to a stream (d) which comprises at least one oxygen source,
   iii) mixing the stream (c) and the stream (d) with a static or dynamic mixer to give a stream (e),
   iv) introducing stream (e) into a reaction chamber and igniting stream (e) to produce fumed silica, and
   v) removing the fumed silica from the reactor.

2. The process of claim 1, wherein the stream (b) further comprises at least one of tetrachlorosilane ($SiCl_4$), trichlorosilane ($HSiCl_3$), trichloromethylsilane ($CH_3SiCl_3$) or dichloromethylsilane ($CH_4Cl_2Si$), as further silicon compounds(s).

3. The process of claim 1, wherein the fuel gas comprises natural gas, hydrogen or a mixture of natural gas and hydrogen.

4. The process of claim 1, wherein the fuel gas consists of hydrogen.

5. The process of claim 1, wherein the stream (d) comprises air.

6. The process of claim 1, wherein the proportion of the fuel gas is at least 1 percent by weight based on the total mass of the mixture of fuel gas and silicon compound(s).

7. The process of claim 1, wherein the stream (c) is filtered prior to mixing with stream (d).

8. The process of claim 1, wherein the streams (a) and (b) are contacted with each other in a filter.

9. The process of claim 1, wherein the reactor is configured to allow the supply of stream (c) to be interrupted.

10. The process of claim 1, which is first conducted in a start-up mode, and subsequently, in a sustained operation mode in which the stream (a) and the stream (b) are kept separated and are contacted with stream (d) upstream of a mixer, in any sequence.

11. The process of claim 10, wherein the start-up mode has a duration of one hour at most.

12. The process of claim 1, wherein stream (b) does not contain methyltrichlorosilane.

13. A process for producing fumed silica in a reactor, comprising:
   i) combining a fuel gas-containing stream (a) with a stream (b) containing dichlorosilane, monochlorosilane, monosilane, or a mixture thereof, and optionally further containing one or more chlorosilanes selected from the group consisting of tetrachlorosilane, trichlorosilane, and methyldichlorosilane, without using a static or dynamic mixer, to give a stream (c),
   ii) supplying the stream (c) to a stream (d) which comprises at least one oxygen source,
   iii) mixing the stream (c) and the stream (d) with a static or dynamic mixer to give a stream (e),
   iv) introducing stream (e) into a reaction chamber and igniting stream (e) to produce fumed silica, and
   v) removing the fumed silica from the reactor.

14. The process of claim 1, wherein in stream (c), solid deposits of reactive compounds are formed.

15. The process of claim 7, wherein the filter fillers out solid deposits of reactive compounds from stream (c).

16. The process of claim 1, wherein a distance between a point at which streams (a) and (b) contact each other to form stream (c) and a point at which stream (d) contacts stream (c) is at least 0.5 m.

17. The process of claim 1, wherein a non-return fitting mechanically interrupts a pipeline connecting stream (c) with stream (d).

18. The process of claim 1, wherein the temperature of stream (d) is at least 5° C. below the ignition temperature of stream (c).

19. The process of claim 1, wherein the stream (c) has a higher ignition temperature than does a stream of identical component concentration which has been mixed using a static or dynamic mixer.

20. A process for producing fumed silica in a reactor, comprising:
   i) combining a stream (a) which comprises at least one fuel gas, with a stream (b), which contains tetrachlorosilane, low ignition temperature silanes selected from the group consisting of dichlorosilane, monochlorosilane, monosilane, and mixtures thereof, and optionally dichloromethylsilane and chlorosilanes other than tetrachlorosilane, without using a static or dynamic mixer, to give a stream (c),
   ii) supplying the stream (c) to a stream (d) which comprises at least one oxygen source,
   iii) mixing the stream (c) and the stream (d) with a static or dynamic mixer to give a stream (e),
   iv) introducing stream (e) into a reaction chamber and igniting stream (e) to produce fumed silica, and
   v) removing the fumed silica from the reactor.

* * * * *